(12) United States Patent
Hansen et al.

(10) Patent No.: US 8,238,846 B2
(45) Date of Patent: Aug. 7, 2012

(54) MULTI CARRIER LEAKAGE TUNING BY ERROR POWER DETECTION

(75) Inventors: Niels Hansen, Frederiksberg (DK); Mikkel Christian Wendelboe Hoyerby, Koebenhavn SV (DK)

(73) Assignee: Motorola Solutions, Inc., Schaumburg, IL (US)

( * ) Notice: Subject to any disclaimer, the term of this patent is extended or adjusted under 35 U.S.C. 154(b) by 432 days.

(21) Appl. No.: 12/641,596

(22) Filed: Dec. 18, 2009

(65) Prior Publication Data

US 2011/0151813 A1 Jun. 23, 2011

(51) Int. Cl.
*H04B 1/02* (2006.01)
*H04B 1/04* (2006.01)

(52) U.S. Cl. ......... 455/91; 455/114.2; 455/126

(58) Field of Classification Search .......... 455/67.11, 455/67.13, 91, 114.2–115.1, 126–127.2, 455/296

See application file for complete search history.

(56) References Cited

U.S. PATENT DOCUMENTS

| | | | | |
|---|---|---|---|---|
| 5,396,196 | A * | 3/1995 | Blodgett | 332/103 |
| 5,574,994 | A * | 11/1996 | Huang et al. | 455/126 |
| 5,584,059 | A | 12/1996 | Turney et al. | |
| 5,783,968 | A | 7/1998 | Melton | |
| 6,081,698 | A * | 6/2000 | Moriyama et al. | 455/126 |
| 6,941,118 | B2 * | 9/2005 | Yamamoto | 455/126 |
| 6,987,954 | B2 * | 1/2006 | Nielsen | 455/114.3 |
| 7,280,805 | B2 * | 10/2007 | Xu et al. | 455/67.11 |
| 7,542,519 | B2 * | 6/2009 | McCallister | 375/297 |
| 7,657,236 | B2 * | 2/2010 | Pan | 455/114.2 |
| 8,090,036 | B2 * | 1/2012 | Okada et al. | 375/260 |
| 2001/0041546 | A1 * | 11/2001 | Kazakevich | 455/118 |
| 2004/0132424 | A1 | 7/2004 | Aytur et al. | |
| 2004/0137856 | A1 * | 7/2004 | Kanazawa et al. | 455/91 |
| 2004/0250192 | A1 * | 12/2004 | Kanazawa | 714/746 |
| 2007/0042728 | A1 | 2/2007 | Pan | |
| 2007/0111682 | A1 * | 5/2007 | Mucke | 455/127.1 |
| 2008/0280579 | A1 | 11/2008 | Cloutier et al. | |

FOREIGN PATENT DOCUMENTS

| | | |
|---|---|---|
| EP | 2019486 A1 | 1/2009 |
| GB | 2 329 085 A | 3/1999 |

OTHER PUBLICATIONS

C.N. Wilson, et al., "A New Generation Cartesian Loop Trasnsmitter for Flexible Radio Solutions and Software Defined Radio," Wireless Design & Development, Advantage Business Media, downloaded from http://www.wirelessdesignmag.com, May 22, 2009 5 pages.
CML Microcircuits, "Application Note—CMX998 Cartesian Feedback Loop DC Calibration," CML Microcircuits Communications Semiconductors, Publication: AN/2WR/998/DCCal/1, Nov. 2006, 36 pages.
PCT International Search Report Dated Feb. 9, 2011.

* cited by examiner

*Primary Examiner* — Simon Nguyen
(74) *Attorney, Agent, or Firm* — Anthony P. Curtis; Daniel R. Bestor (57) ABSTRACT

A communication device and method of removing an LO leakage signal from a signal path on the fly is disclosed. The signal path may be that of a transmitter or receiver. An initial RF output signal, containing a desired RF output signal and an LO leakage signal, is supplied from a feedforward path to a combiner/splitter on a feedback path. A 180° out-of-phase copy of the desired RF output signal is also supplied to the combiner/splitter. The resulting LO leakage signal is downconverted and the power of the down-converted signal determined and used to suppress the LO leakage signal. The resulting LO leakage signal is also supplied to the feedforward path of the feedback loop.

14 Claims, 8 Drawing Sheets

MULTI CARRIER LEAKAGE TUNING BY ERROR POWER DETECTION

TECHNICAL FIELD

The present application relates generally to a communication device, and in particular to the correction of DC offsets on the fly in a multicarrier communication device containing a feedback loop.

BACKGROUND

Existing wireless communications networks, such as a wireless Local Area Networks (LANs), contain a multitude of wireless communication devices (e.g., cellular telephones, personal digital assistants, laptop computers) located within a relatively small geographical area and that simultaneously communicate with the same wireless access point. The devices operate on one or more Radio Frequency (RF) channels, the physical resources over which information is passed between the devices. Generally, in both analog and digital wireless communications, data is modulated by a desired RF signal of suitable frequency, thereby generating a modulated RF signal. The modulated RF signal is transmitted over the air, after being converted to a digital signal if desired, to a radio receiver on a selected RF channel.

More specifically, the RF signal is modulated with a local oscillator (LO) to produce the modulated signal. The LO can directly modulate the data from baseband (approximately 0 Hz) directly to the desired transmission frequency. Other transmitters can use multiple intermediate frequency stages to modulate the data from baseband to the desired frequency. While direct modulation is desirable due to the simplicity and reduced cost due to the number of components, it is subject to an increased amount of DC offset. Several sources of DC offset exist, including characteristic mismatches of electronic components in the different transmission paths, which provide a baseband DC offset, and coupling of the LO signal directly into the transmission path. Similar problems exist in receivers. These DC offset errors combine to provide an undesirable LO leakage signal that can interfere with detection and demodulation of the transmitted signal in the receiver.

To minimize the LO leakage signal, training systems may be incorporated into the transmitter and/or receiver. Such training systems use both digital and analog circuits that temporarily configure the transmitter/receiver to a known training state to estimate and compensate for the LO leakage signal (from both the direct LO coupling component and baseband DC offset component) and to achieve optimal post-training performance. While such techniques enjoy many advantages, they are expensive in terms of processing power and additional components. Moreover, the modulation must be stopped while such tuning occurs. This delays signal transmission and in extreme cases may lead to data loss. It would thus be desirable to tune and automatically remove the LO leakage signal on the fly without having to shut down the modulation while tuning.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Before describing in detail the various embodiments, it should be observed that such embodiments reside primarily in combinations of method steps and apparatus components related to removal of an LO leakage signal from a signal path on the fly. The signal path may be that of a transmitter or receiver employing quadrature modulation, such as in a base station. An ideal RF output signal is injected and used to reduce the actual RF output signal to the LO leakage signal. The resulting signal is then down-converted, the power of the down-converted signal detected, and removed. Thus, the suppression is provided on the fly, while the signal is being transmitted or received over the air, without using a training mode or a special test tone for alignment.

As described, modern RF transmitters use analog or digital modulated carriers. Examples of systems in which carriers are digitally modulated include TErrestrial Trunked Radio (TETRA), Integrated Digital Enhanced Network (iDEN), and Global System for Mobile communications (GSM) systems. Such systems contain base stations and communication devices that the base stations serve, each of which has an RF transmitter. It is desirable for these transmitters to provide a high-power RF output for the antenna with a minimum of unwanted signal components. High power and signal fidelity are achieved using the combination of an RF power amplifier with linearization for reducing the errors inevitably introduced by the power amplifier.

Figure 3:
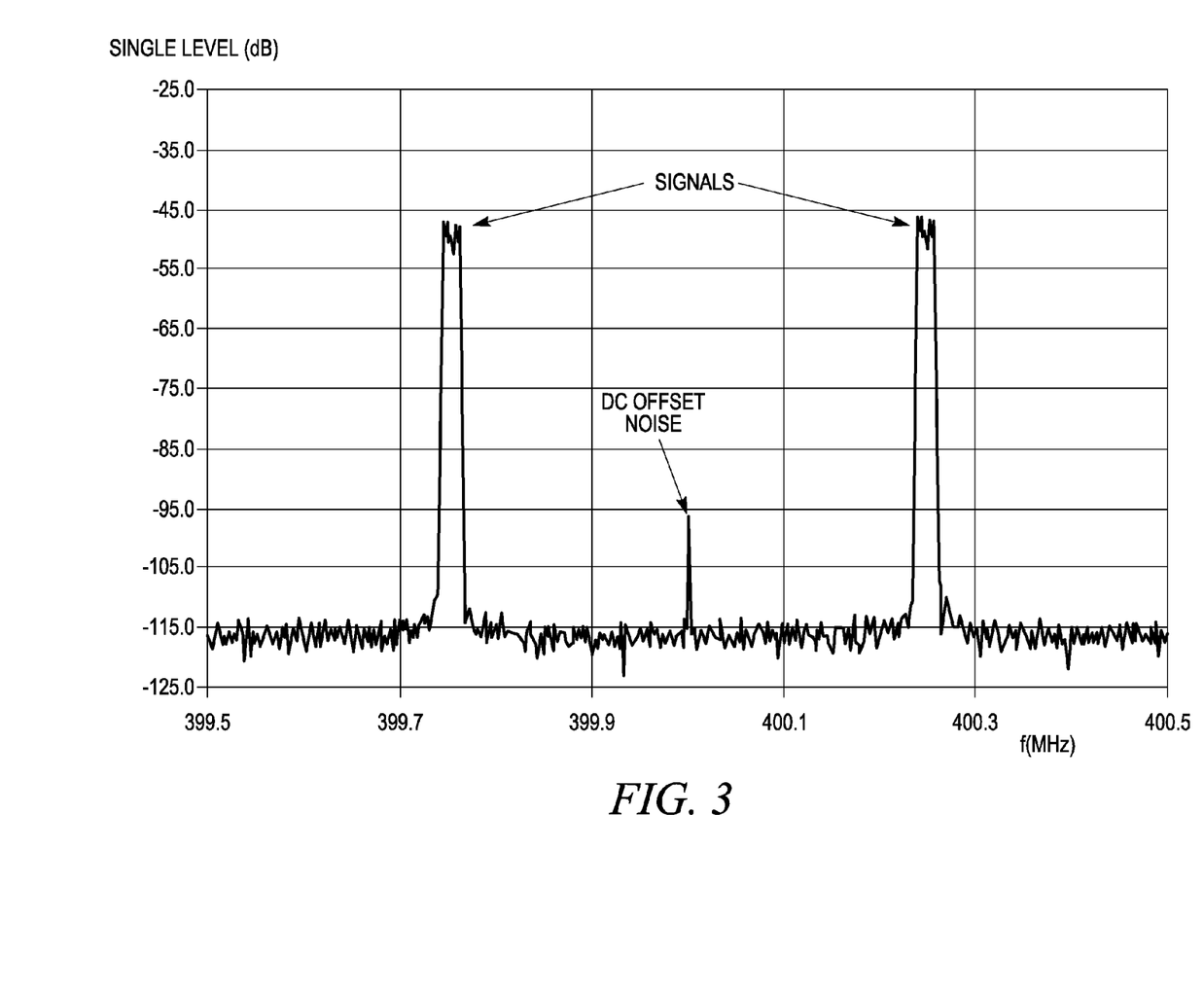
FIG. 3 is a graph showing signal and noise in a multicarrier transmitter.

While both base stations and communication devices contain an RF power amplifier and linearization system, increasing the signal fidelity for base stations may be more problematic due to the higher amplification used. Moreover, base stations typically transmit multiple carriers simultaneously. Usually one RF power amplifier is provided per carrier, it is sometimes technologically feasible to use a single RF power amplifier per carrier for the multiple carriers. In TETRA systems in particular, multicarrier RF power amplifiers for base stations are attractive from a systems cost perspective. The problem with such systems is the increased carrier leakage present at the output. One example of a plot of a base station transmitting multiple carriers is shown in FIG. 3. In FIG. 3, only two carriers are shown at 399.75 and 400.25 MHz (e.g., TETRA devices currently operate in the 300-500 MHz frequency range but an increasing number are using frequencies around 900-900 MHz), with a noise floor about 70 dB below the signal levels. As is apparent, the RF modulation is at 400 MHz and the signal is at 250 kHz. DC offset is a DC signal and is thus modulated to 400 MHz. It is only about 50 dB below the carrier levels. This is fully about 20 dB above the noise floor and in many systems is above the acceptable noise level. For example, TETRA currently requires the signal level to be 80 dB higher than the noise level.

Figure 1:
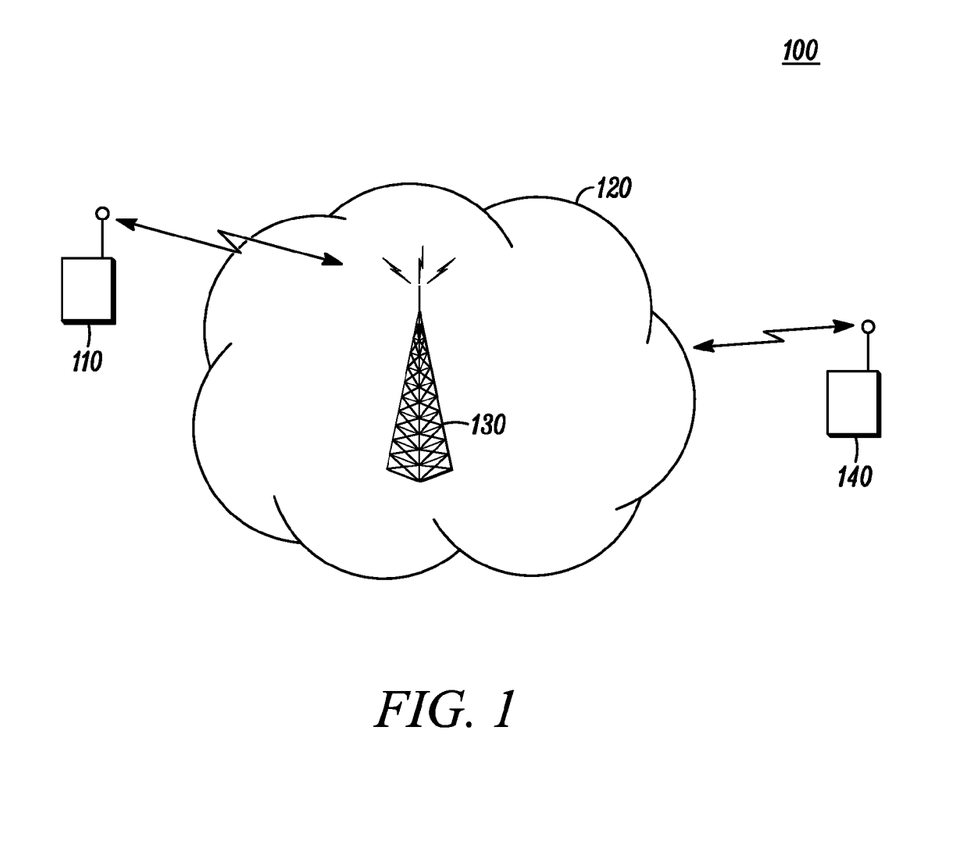
FIG. 1 illustrates one embodiment of a communication system.

One embodiment of a communication system is illustrated in FIG. 1. The system 100 contains communication devices 102, 104 and an infrastructure 120. The communication devices 102, 104 include a transmitter 102 and one or more receivers 104. The transmitter 102 initiates a transmission that is eventually received by the receiver 104. The transmission can be analog or digital and may contain audio, textual and/or visual data. The communication devices 102, 104 may communicate using any of a number of known modulation types such as $\pi/4$-DQPSK, 9PSK, QAM in systems such as CDMA, TDMA, OFMA, TETRA. The communication devices 102, 104 may be mobile or fixed to one location. The infrastructure 120 includes base stations 130 and other devices, however only one base station 130 is shown for convenience. Each base station 120 serves communication devices that lie within its cell. The communication devices 102, 104 may be in the same or different cells.

Figure 2:
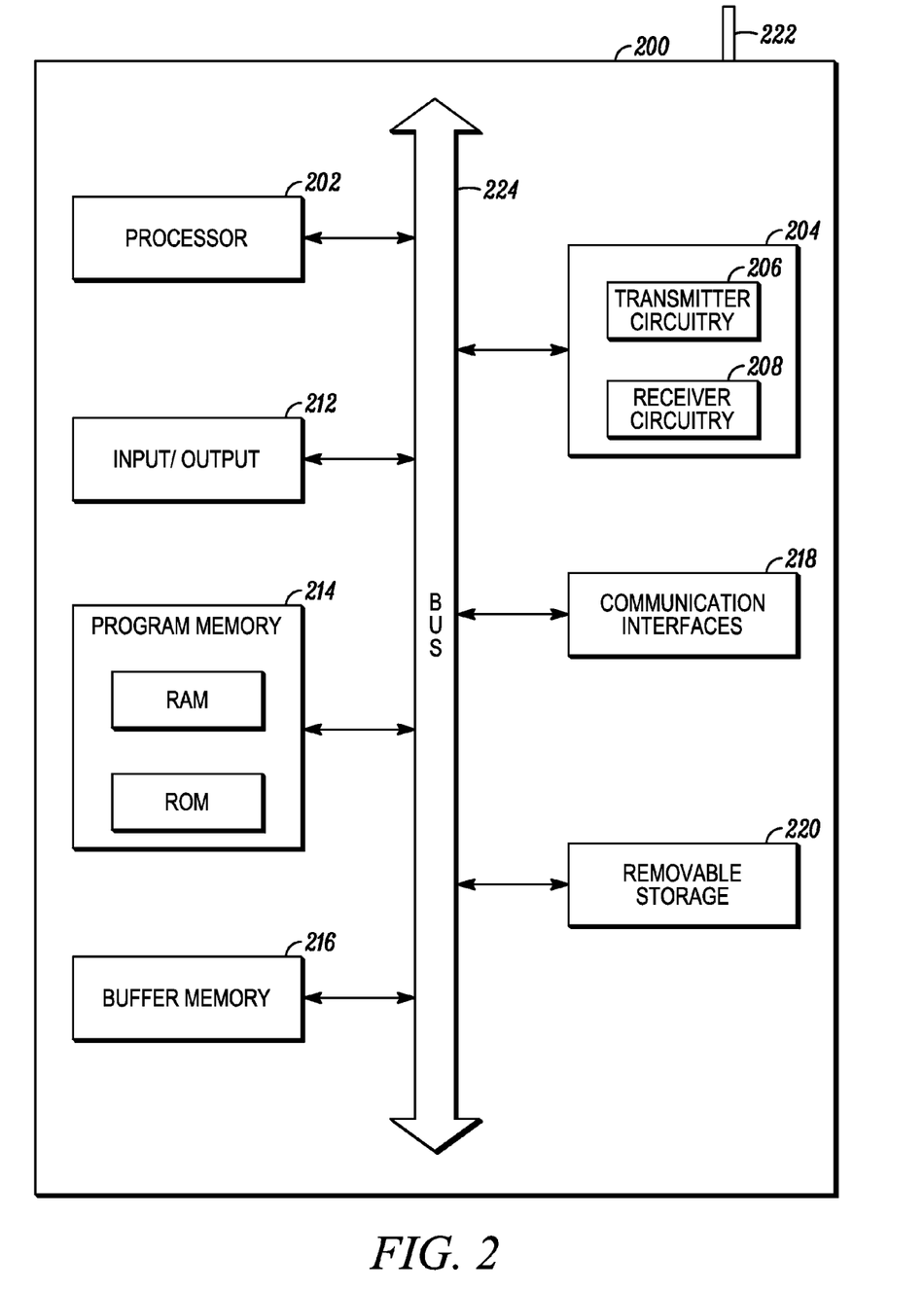
FIG. 2 illustrates a block diagram of an embodiment of a base station.

One example of a block diagram of a base station is shown in FIG. 2. The base station 200 contains, among other components, a processor 202, a transceiver 204 including transmitter circuitry 206 and receiver circuitry 208, an antenna 222, input device(s) 212, a program memory 214 for storing operating instructions that are executed by the processor 202, a buffer memory 216, one or more communication interfaces 218, and a removable storage 220. The base station 200 is preferably an integrated unit containing at least all the elements depicted in FIG. 2, as well as any other element necessary for the base station 200 to perform its electronic function. Alternatively, the base station 200 may comprise a collection of appropriately interconnected units or devices, wherein such units or devices perform functions that are equivalent to the functions performed by the elements of the base station 200. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are preferably stored in the program memory 214. The program memory 214 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry.

The operations performed by the processor 202 and the rest of the base station 200 are described in detail below.

The transmitter circuitry 206 and the receiver circuitry 208 enable the base station 200 to respectively transmit outgoing signal(s) and receive other incoming communication signal(s). In this regard, the transmitter circuitry 206 and the receiver circuitry 208 include appropriate circuitry to enable wireless transmissions. The implementations of the transmitter circuitry 206 and the receiver circuitry 208 depend on the implementation of the base station 200 and mobile devices with which it is to interact. For example, the transmitter and receiver circuitry 206, 208 may be implemented as part of the base station hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding.

The antenna 222 comprises any known or developed structure for radiating and receiving electromagnetic energy at the interference frequency. The buffer memory 216 may be any form of volatile memory, such as RAM, and is used for temporarily storing received information. The input/output devices 212, which are optional, may include an LCD, OLED, or any other known display, one or more speakers and microphones, an alpha-numeric keyboard, isolated buttons, soft and/or hard keys, touch screen, jog wheel, and/or any other known input device.

Figure 4:
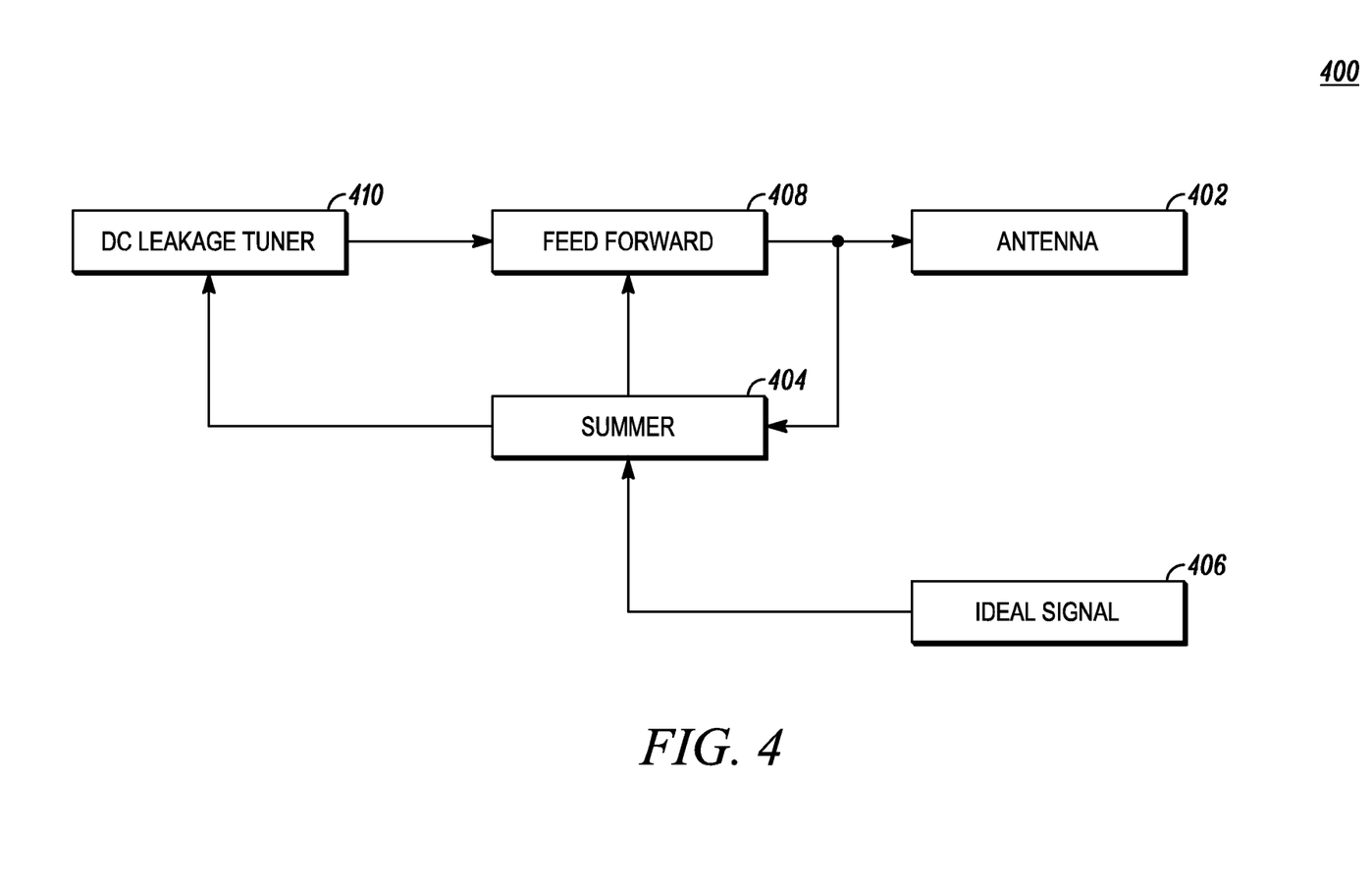
FIG. 4 is a block diagram of an embodiment of a base station.

One embodiment of a simplified block diagram of a transmitter containing a linearization scheme to reduce the DC offset is shown in FIG. 4. As shown, the transmitter 400 generally contains an antenna 402 to which output digital signals are supplied. These signals, initially containing both the desired signal and the DC offset, are sampled and supplied to a summer 404. Also supplied to the summer 404 is the ideal signal, without the DC offset. These two signals are summed in opposite phase to generate a summed (or feedback) signal which is the DC offset and is provided to both the feedforward portion 408 of a feedback system and DC leakage tuner 410. The DC leakage tuner 410 detects and suppresses the DC offset. The feedforward portion 408 of the feedback system uses the output from the DC leakage tuner 410 as well as from the summed signal to correct the signal before supplying the corrected signal to the antenna 402.

As shown, the feedback system thus includes the summer 404 and the feedforward portion 408. Although not shown, the signal to be transmitted is provided to the feedforward portion 408 of the feedback system. The signal to be transmitted may contain both in-phase (I) and quadrature-phase (Q) components that are 90° out of phase with the in-phase component. If the feedback system has high gain, there will be nearly zero carrier signal at the summation point, in the feedforward portion 406, of the feedback signal and the desired signal to be transmitted. However, since the DC leakage is an artefact of the feedback loop itself, the DC leakage signal appears at relatively much higher level than the desired signal. The DC leakage can therefore be amplified, detected and used as an input to the carrier leakage suppressor algorithm in the processor (shown in FIG. 2) that continually tunes/adjusts the I and Q path DC components to minimize the response. This can be done in a continuous fashion as no interference to the modulation carrying signals is taking place.

Figure 5:
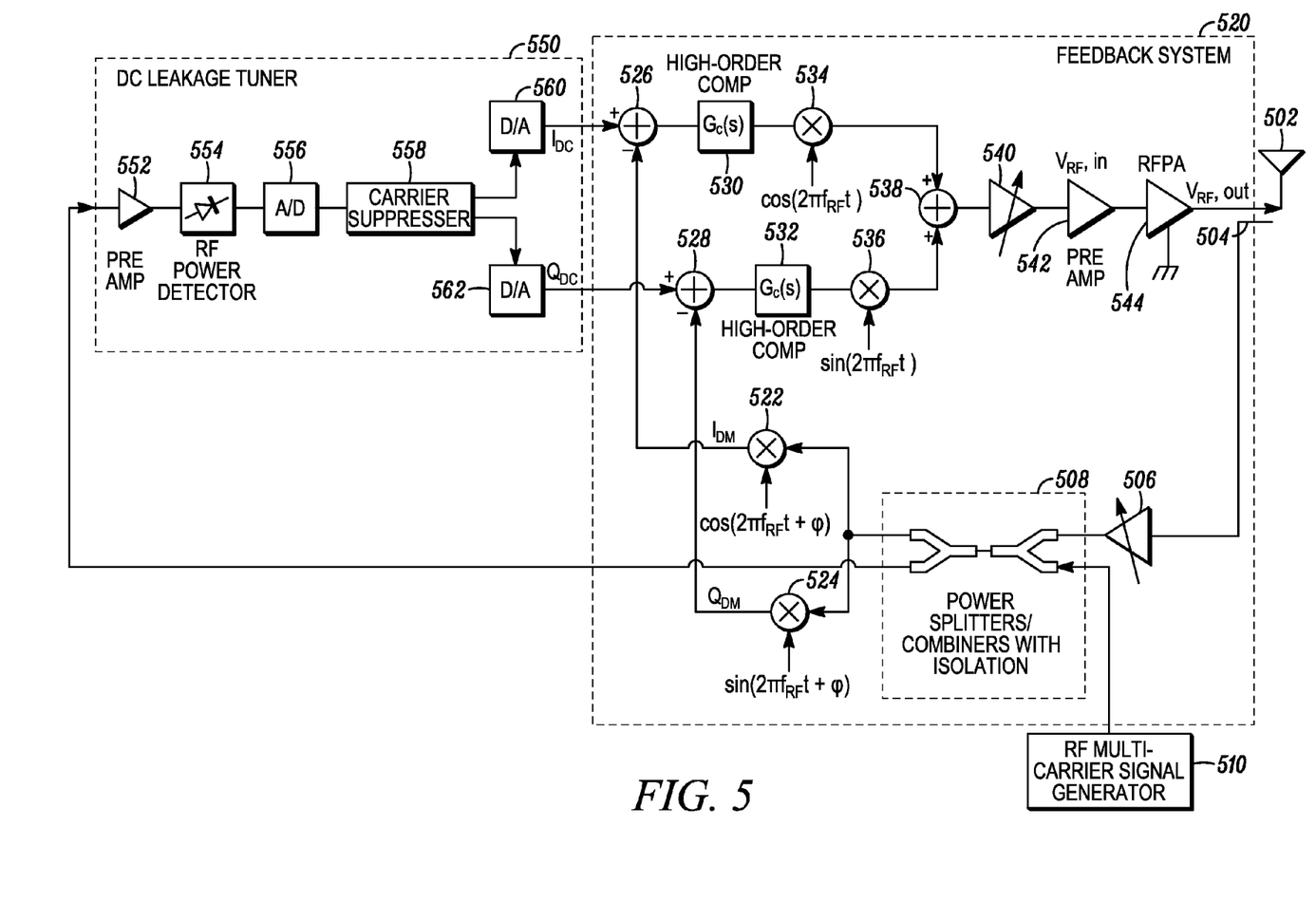
FIG. 5 is a more detailed block diagram of an embodiment of a base station.

One embodiment of such a multicarrier transmitter containing a Cartesian loop feedback system is shown in FIG. 5.

As long as the feedback path does not introduce distortion, the system will attempt to correct the signal at the output to match the ideal input I/Q input signal coming from the RF multicarrier generator 510. As shown, an RF output signal is transmitted from an antenna 502. A coupler 504 is employed to sense the RF output signal prior to being transmitted using the antenna 502. The actual RF signal, which initially contains both the desired RF multicarrier signal and the DC offset, is supplied to a variable attenuator (/amplifier) 506 to a pair of combiners/splitters 508. Also provided to the combiners/splitters 508 is the ideal (or desired) RF signal, which is generated by an RF multicarrier signal generator 510. As is apparent, an RF signal is a signal whose frequency is that of transmission, not baseband. Unlike other Cartesian loop feedback systems, the signal supplied to the combiners/splitters 508 is at the same frequency as the signals supplied to the antenna 502—that is, the signal is not down-converted to baseband or any other IF frequency prior to being combined with the signal from the RF multicarrier signal generator 510. Operating at RF allows the mixers 522, 524 to operate on very low level signals as compared to traditional loop relaxing linearity requirements, in particular as they are in the forward path (where linearity is of less importance). In addition, the leakage signal to be detected is a single signal, whereas at baseband both I and Q leakage signals are measured.

In particular, the signal from the RF multicarrier signal generator 510 is a low-level signal that is 180° out of phase from the signal from the coupler 504. Thus, the signal from the RF multicarrier signal generator 510 is effectively subtracted from the signal from the coupler 504, resulting in primarily only the DC offset noise signal. After the signals are combined, they are then split by the combiners/splitters 508, with the combination and splitter portion of the combiners/splitters 508 being RF isolated from each other. It is thus desirable to minimize the signal obtained from the combiners/splitters 508. The combiners/splitters 508 provide two signals: one signal is eventually provided to the feedforward portion of the feedback loop 520 and the other signal provided to the DC leakage tuner 550, which supplies the feedforward portion of the feedback loop 520.

The signal from the combiners/splitters 508 that is to be combined in the feedforward portion of the feedback loop 520 is split into two signals and modulated to baseband using by down-converters (mixers) 522, 524. More specifically, the down-converters 522, 524 mix the RF signal from the combiners/splitters 508 with $\cos(2\pi f_{RF}t+\phi)$ for the I signal and $\sin(2\pi f_{RF}t+\phi)$ for the Q signal, where $f_{RF}$ is the transmission frequency of the desired signal, $\phi$ is an adjustable phase shift to compensate for delay caused by the feedback loop 520. In essence, the use of the adjustable phase shift assures that only the I component of the signal reaches the I summation point and likewise for the Q component.

Figure 6:
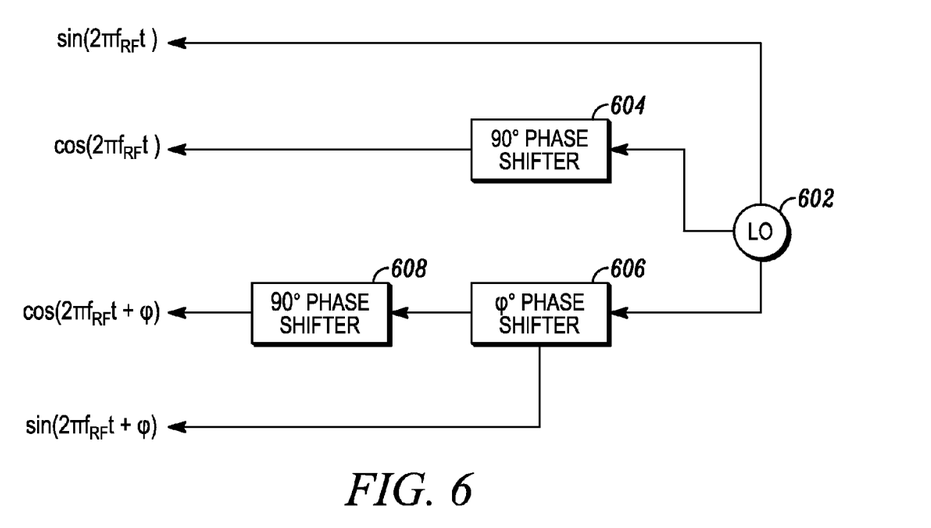
FIG. 6 is an embodiment of a LO and phase shifters used in the base station of FIG. 5.

An example of the local oscillator (LO) providing the modulated signal, loop phase shifter providing phase shift $\phi$ and phase shifter providing the 90° phase shift between the I and Q signals for any of the mixers are shown in FIG. 6 for convenience (nor is any correction for phase difference between the I and Q paths that may be due to a non-ideal 90° phase shift). As shown, the LO 602 provides a first LO signal $\sin(2\pi f_{RF}t)$ while a 90° phase shifter 604 provides a second LO signal $\cos t(2\pi f_{RF}t)$. The first LO signal is also supplied to a $\phi$° phase shifter 606 (where $\phi$ is the phase shift around the loop), which provides a third LO signal $\sin(2\pi f_{RF}t+\phi)$. The third LO signal is supplied to another 90° phase shifter 608 to provide a fourth LO signal $\cos(2\pi f_{RF}t+\phi)$.

Returning to FIG. 5, the baseband signals $I_{DC}$ and $Q_{DC}$ from the down-converters 522, 524 are supplied to summers 526, 528, which subtract the I and $Q_{DC}$ from the mixers 522, 524 with I and Q signals from the DC leakage tuner 550. The resulting DC signals from the summers 526, 528 are supplied to filters 530, 532, which provide high-order compensation G(s) to the resulting DC signals. In this context, high order compensation refers to a loop filter of order higher than 1 designed to provide stable operation of the loop and enhanced low frequency loop gain through the extra orders. Additional components, such as filters along each signal path may be present, but are not shown for convenience. The compensated signals from the filters 530, 532 are then modulated at the carrier frequency using up-converters (mixers) 534, 536. The up-converters 534, 536 mix the compensated $I_{DC}$ signal from filter 530 with $\cos(2\pi f_{RF}t)$ and the compensated $Q_{DC}$ signal from filter 532 with $\sin(2\pi f_{RF}t)$, respectively. The modulated I and Q signals from the up-converters 534, 536 are then added together at summer 538, and then attenuated using variable attenuator 540. The amount of attenuation is controlled by the processor in a number of ways known in the art. The attenuated signal from the variable attenuator 540 is then supplied to an optional preamplifier 542 and then to a high power RF amplifier 544. Each of these components is known to one of skill and thus will not be described in detail.

As indicated above, the other signal from the combiners/splitters 508 is supplied to the DC leakage tuner 550. As shown, the signal is supplied to an optional preamplifier 552 and then to an RF power detector 554. The RF power detector 554 may be, for example, a diode detector and detects the power of the amplified DC offset signal from the combiners/splitters 508. The output from the RF power detector 554 is then supplied to an analog-to-digital (A/D) converter 556. The A/D converter 556 operates, for example at 10 ksps (kilosamples/s) over 12-16 bits. A carrier suppresser 558 receives the digital signal from the A/D converter 556 and suppresses the digitized DC offset signal by providing sufficient DC offset in the opposite direction to minimize input signal being supplied to the DC leakage tuner 550. The output from the carrier suppresser 558 is then converted by a pair of digital-to-analog (D/A) converters 560, 562 operating at the same rate as the A/D converter 556. The D/A converters 560, 562 provide I and Q signals to the summers 526, 528.

In one embodiment, the algorithm in the carrier suppressor 558 initially sets a compensation value for the I or Q signal (e.g., in the middle of the range of the A/D converter 556 or the last compensation value used for the I or Q signal) to an initial value. The power at the RF power detector 554 is then measured and stored as a reference power. The I or Q compensation value is incremented and decremented and the power measured after each change and compared to the reference power. The amount of increment and decrement may be, for example, 1 bit, which for a 12 bit A/D converter is 1/4096 of the range of the converter. If the measured power is less than the reference power after either change, this measured power is stored as the new reference power and the compensation value stored. This cycle repeats using the stored compensation value until the power is minimized and no adjustment to the stored compensation value occurs. The process then turns to the other of I and Q signal and repeats the cycle for that signal. After the power for this signal is minimized and the compensation value stored, the process returns to the initial I or Q signal that was compensated and re-measures and re-adjusts, if necessary. This return to the initial I or Q signal may occur, for instance, after a predetermined delay, at predetermined intervals, or after a predetermined change in power level. The carrier suppressor 558 in various embodiments is disposed in a processor such as a DSP, and the remaining components shown in FIG. 5 are separate.

As described previously, one source of the LO leakage signal is a DC offset between the electronic components along the I and Q paths, causing the I and Q components at the input of the mixer 534, 536 respectively to include a DC component. As a result, the DC component is up-converted and subsequently appears in the transmitter output signal. Another source of the LO leakage signal is direct LO coupling of the LO signal to the I and Q paths (e.g., between the mixers 534, 536 and the antenna 502). Both sources lead to the signal shown in FIG. 3. The DC leakage tuner 550 suppresses this LO leakage signal.

Figure 7:
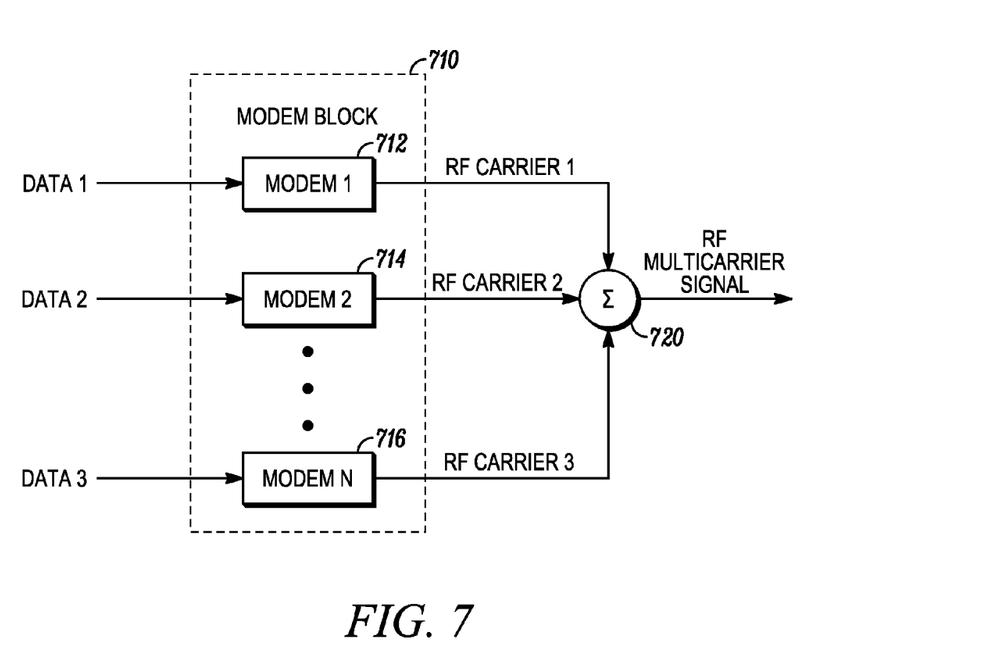
FIG. 7 is an embodiment of an RF signal generator as shown in FIG. 5.

One example of the RF multi-carrier signal generator 510 of FIG. 5 is shown in FIG. 7. The RF signal from this generator is lower than what is delivered to the antenna 502 at FIG. 5. Therefore losses are not so critical at this point. In the embodiment shown in FIG. 7, the carriers are created one at a time, individually up-converted and then the desired carriers are combined into one output signal. As illustrated, a modem block 710 contains n modems 712, 714, 716. A different data signal is supplied to each of the modems 712, 714, 716. Each modem 712, 714, 716 generates one of the RF signals in the multi-carrier signal. Each RF signal is at a different frequency. The signals from the modems 712, 714, 716 are then combined at a summer 720 and supplied as the RF multi-carrier signal from the RF multi-carrier signal generator. Although other means for creating the RF multi-carrier signal exist, the method shown in FIG. 7 permits creation of a multicarrier signal with more than 100 dB ultimate signal to noise ratio.

Figure 8:
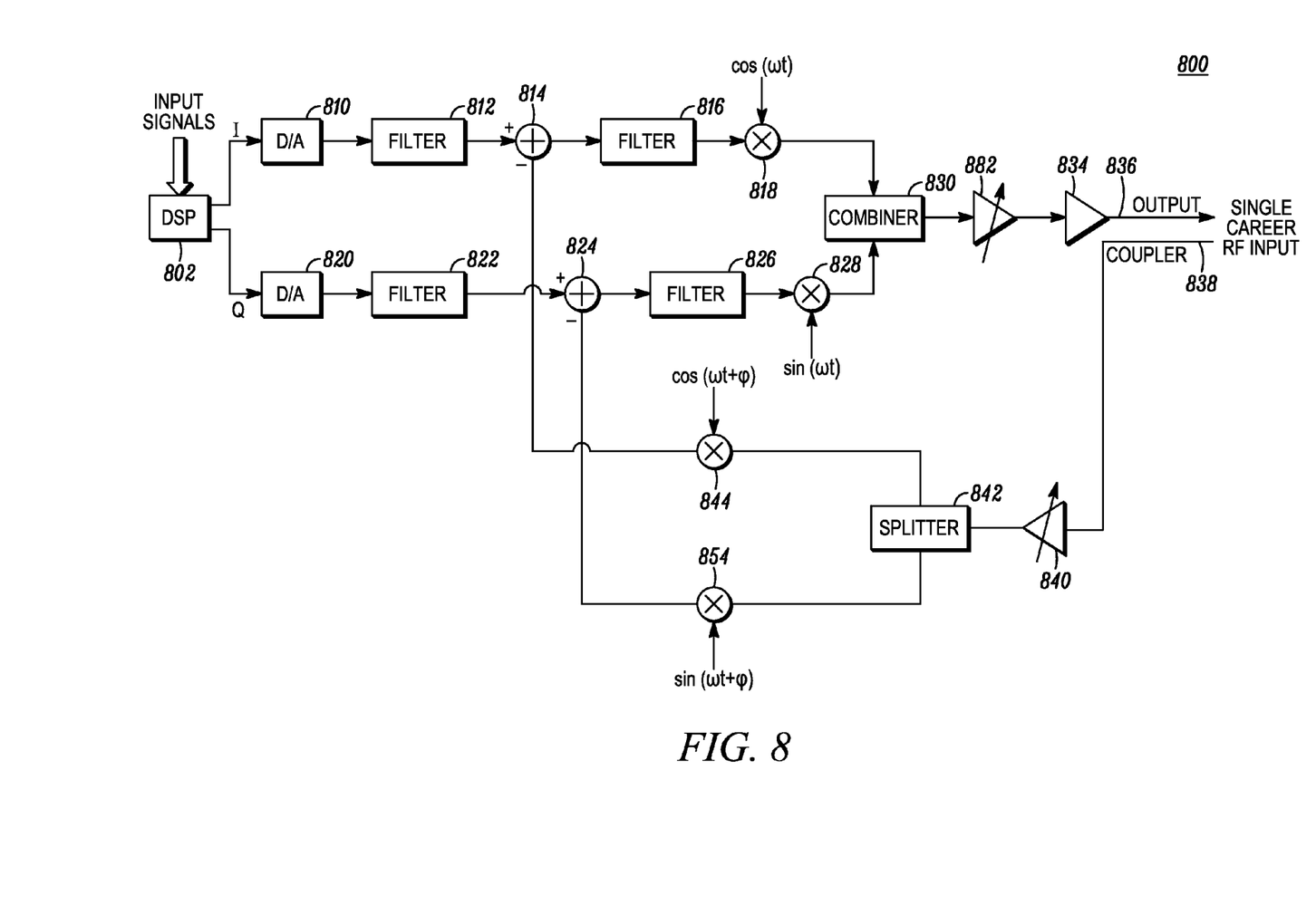
FIG. 8 is an embodiment of a modem as shown in FIG. 7.

Turning to the modem, one embodiment that employs Cartesian feedback is shown in FIG. 8. As shown, digital signals to be encoded are supplied to a digital signal processor (DSP) 802 of the modem 800. The DSP 802 processes the signal by encoding them to the appropriate I and Q signals according to the desired modulation. The signal is also split by the DSP 802 into individual I and Q signals, each of which is provided to a D/A converter 810, 820 that converts the digital I and Q signals to analog baseband signals. Each analog baseband signal is then filtered using a low pass filter (LPF) 812, 822. The signal from each LPF 812, 822 are then combined at an adder 814, 824 with a signal from a feedback loop and then filtered by a loop LPF 816, 826. The filtered signal from the loop LPF 816, 826 is supplied to a mixer 818, 828, where the signal is up-converted at the modulation frequency ω. As above, each modem up-converts the baseband analog signal at a different frequency ω. The I and Q signals are then combined at a combiner 830 whose output is attenuated by a variable attenuator 832 before being amplified by a power amplifier 834 and sent to the output 836. The single carrier RF output signal at the output 836 is coupled to the feedback loop using a coupler 838. The signal from the coupler 838 is attenuated by a variable attenuator 840 before being split and provided along I and Q signal paths by a splitter 842. The signals from the splitter 842 are then down-converted to baseband by mixers 844, 854 and fed back to the adders 814, 824. A phase φ is added to the injection signal at the mixers 844, 854 to compensate for delay in the loop. Although Cartesian feedback is shown, other types of feedback, such as polar feedback, may be used. Data could be digitally encoded speech, video images, files or other digital information to be transmitted.

Figure 9:
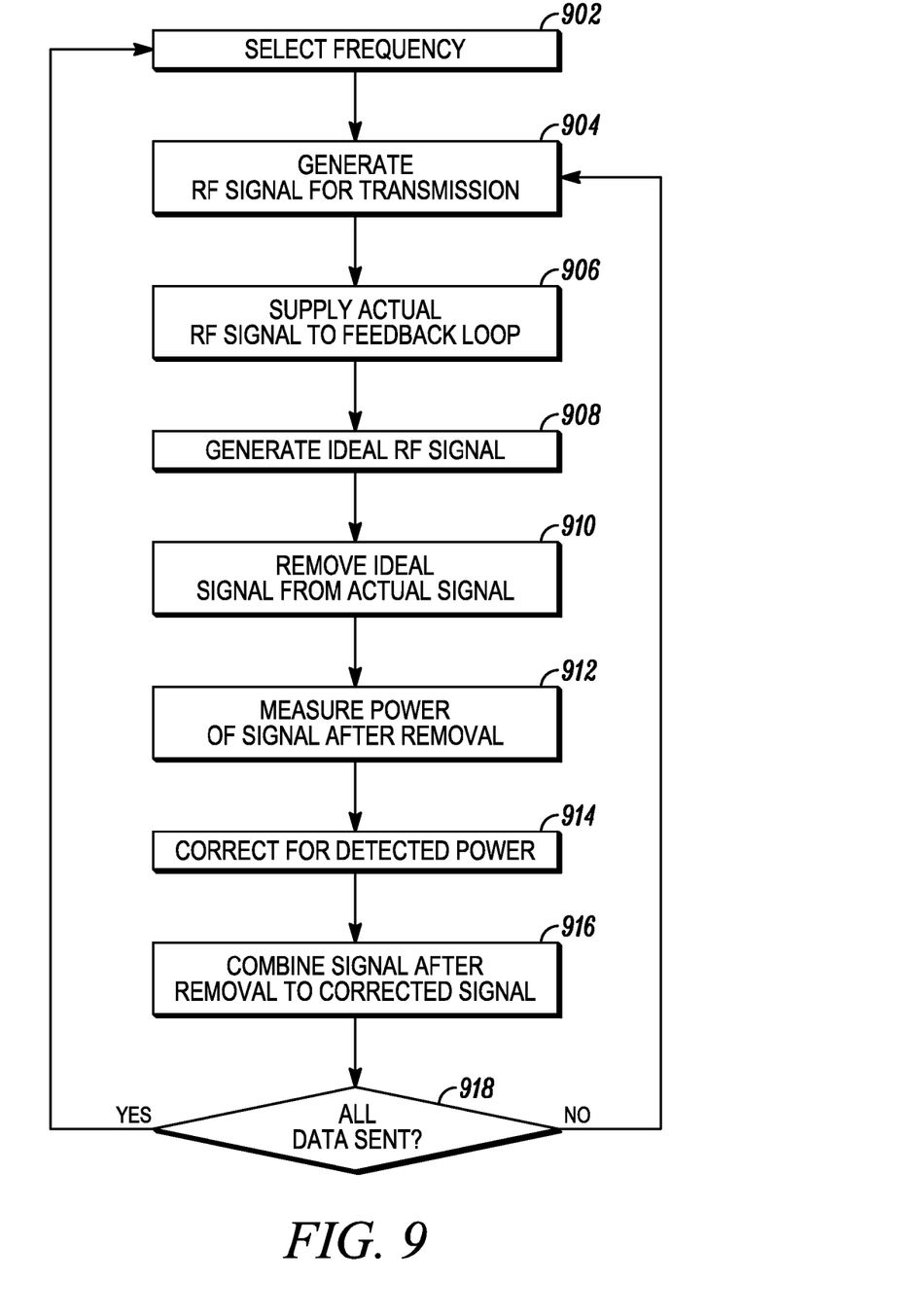
FIG. 9 is a flowchart of one embodiment of operations of the base station.

FIG. 9 shows a flowchart of a method of correcting for the DC leakage signal in a single carrier system. A particular frequency or channel is selected for the transmitter at step 902. The selection can be performed automatically by the base station (or by manually by an operator if the method occurs in a personal communication device). The frequencies may be established automatically in the base station when the base station receives a transmission from a communication device that it is to retransmit through the network.

The actual RF output signal from the transmitter, which contains the ideal signal to transmit as well as the DC leakage signal, is generated at step 904 and initially supplied to a feedback loop at step 906. The ideal RF signal is also generated separately, outside of the feedback loop, at step 908. The ideal RF signal does not contain the DC leakage signal. The ideal RF signal is then removed from the actual RF signal at step 910. The power of the resulting signal, which should contain primarily only the DC leakage signal, is measured at step 912 and the resulting signal suppressed at step 914 using the measured power. The remaining signal, if any, is combined with the signal resulting from the removal of the ideal RF signal from the actual RF signal at step 916.

At step 918, if there is more data to be transmitted, the process returns to correcting for the undesired DC leakage signal. If not, the base station waits until new data is to be transmitted and again selects the frequency of transmission. Note that power detection and correction is a somewhat slow process and thus may occur over multiple symbol transmissions. However, eventually, the DC leakage signal will be compensated and the actual RF output signal will match the ideal RF output signal (within some tolerance). In a multicarrier system, steps 902 and 918 may be eliminated.

Use of a diode power detector will provide a cancellation of about 30-40 dB LO leakage signal, which match the dynamic range of the detector. Using a high dynamic range IC detector such as AD8362 from Analog Devices will increase this cancellation to 70 dB or more depending on the amount of preamplification and loop gain. If desirable, a narrowband receiver IC could be used to increase the cancellation even further.

Although only a transmitter employing a Cartesian feedback loop is shown, a similar method can be used in a transmitter employing a polar feedback loop. As is clear from the figures and above description, Cartesian feedback compares the output I and Q components with the input I and Q components and adjusts the input I and Q components to compensate for the errors introduced by the power amplifier. Polar feedback, on the other hand, compares the output phase and amplitude to the input phase and amplitude of the power amplifier and adjusts the input to account for the distortions introduced by the power amplifier. In systems employing polar feedback, the power of the output amplitude less the power of the ideal output amplitude is detected and suppressed, prior to being applied to the power amplifier. Examples of such systems are well known and thus will not be described. Similarly, although a multicarrier communication device is described, the same method may be used for a single carrier communication device.

The carrier leakage suppressor algorithm, as well as other algorithms described herein, may be a computer program product that includes a series of computer instructions fixed either on a tangible medium, such as a computer readable medium (e.g., flash memory, CD-ROM, ROM, fixed disk). The medium may be a tangible medium (e.g., optical or analog communications lines). The series of computer instructions embodies all or part of the functionality previously described herein with respect to the device. It should appreciate that such computer instructions can be written in a number of programming languages for use with many device architectures or operating systems. Furthermore, such instructions may be stored in any memory device, such as semiconductor, magnetic, optical or other memory—e.g., one of the memories shown in FIG. 2. It is expected that such a computer program product may be distributed as a removable medium with accompanying printed or electronic documentation (e.g., shrink wrapped software) or preloaded with a device (e.g., on system ROM or fixed disk). The computer program product may be run on one or more processors, such as the processor shown in FIG. 2.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure and Summary section are provided to allow the reader to quickly ascertain the nature of the technical disclosure. It is submitted with the understanding that neither will be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The invention claimed is:

1. A method of tuning a communication device to remove a LO leakage signal, the method comprising:
   coupling an initial RF output signal from a feedforward path to a feedback path, the initial RF output signal containing a desired RF output signal and the LO leakage signal;
   generating the desired RF output signal;
   subtracting the generated desired RF output signal from the initial RF output signal to result in an error signal;
   down-converting the error signal to baseband;
   detecting the power of the down-converted signal to form a detected power signal;
   suppressing the LO leakage signal based on the detected power of the down-converted signal; and
   subtracting the down-converted signal from the suppressed signal to form a corrected signal in the feedforward path.

2. The method of claim 1 wherein data supplied to the feedforward path continues to be modulated to RF while the tuning is performed.

3. The method of claim 1 further comprising digitizing the detected power signal prior to suppressing the LO leakage signal and converting the suppressed signal to an analog baseband signal prior to subtracting the down-converted signal.

4. The method of claim 1 wherein the feedforward and feedback paths form a Cartesian feedback loop.

5. The method of claim 1 wherein the feedforward path contains separate paths for I and Q components, the I and Q components being combined form the initial RF output signal prior to coupling the initial RF output signal to the feedback path.

6. The method of claim 1 further comprising transmitting the desired RF output signal over the air after having removed the LO leakage signal.

7. The communication device of claim 1 wherein the communication device is a transmitter that transmits the desired RF output signal over the air after having removed the LO leakage signal.

8. A communication device comprising:
   a coupler that couples an initial RF output signal in a feedforward path to a feedback path, the initial RF output signal containing a desired RF output signal and the LO leakage signal;
   an RF signal generator that generates a copy of the desired RF output signal that is 180° out-of-phase from the desired RF output signal of the initial RF output signal;
   a combiner/splitter within which the generated desired RF output signal is subtracted from the initial RF output signal to result in a corrected signal;
   a DC leakage tuner that eliminates the LO leakage signal after having been supplied with the corrected signal; and
   a summer to which the corrected signal is subtracted from an output of the DC leakage tuner.

9. The communication device of claim 8 wherein data in the feedforward path continues to be modulated to RF while the tuning is performed.

10. The communication device of claim 8 further comprising a mixer that down-converts the corrected signal prior to the corrected signal being supplied to the DC leakage tuner and summer.

11. The communication device of claim 8 wherein the DC leakage tuner comprises a power detector that detects the power of the corrected signal and a suppresser that suppresses the LO leakage signal based on the detected power to form a suppressed signal.

12. The communication device of claim 11 wherein the DC leakage tuner further comprises an A/D converter that digitizes the corrected signal prior to supplying the corrected signal to the power detector and a D/A converter that converts the suppressed signal to an analog baseband signal prior to supplying the suppressed signal to the summer.

13. The communication device of claim 8 wherein the feedforward and feedback paths form a Cartesian feedback loop.

14. The communication device of claim 8 wherein the feedforward path contains separate paths for I and Q components, the I and Q components being combined form the initial RF output signal prior to coupling the initial RF output signal to the feedback path.

* * * * *